United States Patent [19]
Schwartz et al.

[11] Patent Number: 6,136,383
[45] Date of Patent: Oct. 24, 2000

[54] COATING OF MINERAL MOLDINGS WITH RADIATION-CURABLE PREPARATIONS

[75] Inventors: Manfred Schwartz, Frankenthal; Klaus Menzel, Möglingen; Bertold Bechert, Grünstadt; Erich Beck, Ladenburg; Wolfgang Reich, Maxdorf, all of Germany

[73] Assignee: BASF Aktiengesellschaft, Ludwigshafen, Germany

[21] Appl. No.: 09/123,461

[22] Filed: Jul. 28, 1998

[30] Foreign Application Priority Data

Jul. 29, 1997 [DE] Germany ............... 197 32 621

[51] Int. Cl.⁷ ............... C08F 2/46; C08F 2/48
[52] U.S. Cl. ............... 427/513; 427/508; 427/517; 427/518; 522/96; 522/99; 522/104; 522/100; 522/84; 522/85; 522/86; 522/148; 522/172; 522/151; 522/173; 522/181; 522/182
[58] Field of Search ............... 522/96, 84, 85, 522/86, 104, 99, 100, 148, 172, 151, 173, 181, 182; 427/513, 518, 517, 508

[56] References Cited

FOREIGN PATENT DOCUMENTS 0 021 500   1/1981   European Pat. Off. .
195 14 266  10/1996  Germany .
WO 96/33143 10/1996  WIPO .

OTHER PUBLICATIONS

Derwent Abstracts, AN 86–249606, JP 61 178484, Aug. 11, 1986.

Derwent Abstracts, AN 85–016212, JP 59 213682, Dec. 3, 1984.

Derwent Abstracts, AN 79–63773B, JP 54 090330, Jul. 18, 1979.

*Primary Examiner*—James J. Seidleck
*Assistant Examiner*—Sanza McClendon
*Attorney, Agent, or Firm*—Oblon, Spivak, McClelland, Maier & Neustadt, P.C.

[57] ABSTRACT

Radiation-curable preparations comprise at least one polymer which has ethylenically unsaturated double bonds and are used for the coating of mineral moldings.

A process for coating mineral moldings, and also mineral moldings which have a coating cured by radiation, are also described.

14 Claims, No Drawings

COATING OF MINERAL MOLDINGS WITH RADIATION-CURABLE PREPARATIONS

The coating of mineral moldings with radiation-curable preparations

The present invention relates to a process for coating mineral moldings with radiation-curable preparations.

For the purposes of the invention, mineral substrates here and below are in particular moldings which have a mineral binder. For the purposes of the invention, this is specifically a molding which is produced from a mixture (a mortar) made from a mineral binder, water, aggregates and, if desired, auxiliaries, after shaping, by the hardening of the mineral binder-water mixture over time, if desired with exposure to elevated temperature. Mineral binders are well known. They are finely divided inorganic substances, such as lime, gypsum, clay and/or cement, which are converted into their usable form by pasting with water, where the latter solidifies like stone over time when left in air or even under water, if desired with exposure to elevated temperature.

The aggregates are generally composed of granular or fibrous, natural or synthetic stone (gravel, sand, mineral fibers), and in special cases even of metal or organic aggregates or mixtures of the aggregates mentioned, with particle sizes or fiber lengths which are matched to the particular application in a manner known per se. Color pigments are also frequently included in the mixture as aggregates in order to impart color.

Auxiliaries are in particular those substances which accelerate or delay hardening or influence the elasticity or porosity of the solidified mineral molding. These are in particular polymers, such as those disclosed in U.S. Pat. No. 4,340,510, GB-B 15 05 558, U.S. Pat. No. 3,196,122, U.S. Pat. No. 3,043,790, U.S. Pat. No. 3,239,479, DE-A 43 17 035, DE-A 35 43 17 036, JP-A 91/131 533 and other texts.

Examples of mineral moldings to be coated according to the invention are concrete pipes, as used for conveying waste water (cf. for example JP-A 55/44 273), concrete roof tiles (cf. for example DE-A 21 64 256 or DE-A 39 01 073) or kerbstones, steps, base slabs, plinth tiles based on mineral binders and also fiber-reinforced concrete panels, ie. flat mineral moldings which are filled with inorganic or organic fibers, eg. polyester fibers or nylon fibers.

A disadvantage of mineral moldings is that under the influence of weathering (in particular exposure to water) the cationic constituents, such as $Ca^{2+}$ are dissolved out over the course of time, reducing their strength. Another disadvantageous property of mineral moldings is the occurrence of effluorescence phenomena. These are probably attributable to the fact that the mineral binders contain cations of valency greater than one, for example $Ca^{2+}$, in an alkaline environment. Reaction with the carbon dioxide from the air can therefore cause development at the surface of the mineral molding of white spots of lime which have low solubility in water and are unsightly. The evidence of effluorescence may either appear as early as during the hardening of freshly prepared mineral moldings or on exposure to weathering on mineral moldings which are already hardened.

To avoid the abovementioned disadvantageous properties, the mineral moldings are frequently provided with a coating. For this purpose, use is generally made of aqueous coating systems which comprise an aqueous polymer dispersion as binder. Usual binders encompass styrene-acrylate copolymers, homo- and copolymers of vinyl acetate, pure acrylates and the like. The polymer dispersions used as binders generally have emulsifiers to stabilize the polymers in the dispersion. The binder polymers usually also have carboxyl groups, which are intended to give the dispersions better pigment binding power. However, this results in fundamental disadvantages: firstly, the emulsifiers can be dissolved out from the coating on exposure to moisture. This in turn leads to a lessening of the elasticity of the coating. In clear polymer films, furthermore, blushing (clouding) is often observed. The presence of acid groups has the further disadvantage that the polymers swell, thus lessening the strength of the coating. Such coating systems moreover are frequently unable to prevent effluorescence completely. This is true in particular if the coating has been applied to a freshly produced mineral molding. Such freshly produced mineral moldings generally still contain water in considerable amounts; (for example, freshly produced, or green, precast concrete products contain from 5 to 10% by weight of water). During setting, this water, together with the emulsifiers, generally brings about an undesirable effluorescence. The strength of such coatings is also considerably lessened by the swelling of the polymer during the setting of the precast concrete product.

It has been possible to improve the protection of mineral moldings from the effluorescence described above by using coating compositions based on styrene-acrylate dispersions or pure acrylate dispersions, as described in EP-A 469 295, and also in WO 96/33143. The strength of such polymer films on exposure to moisture is, however, still not satisfactory.

EP-A 355 028 describes a process for preventing effluorescence phenomena on mineral substrates by applying, to a mineral substrate, a coating which comprises a conventional polymer as binder and an aromatic ketone as photosensitizer. This involves crosslinking of the surface of the coating. However, these coatings are degraded by weathering over relatively long periods.

The use of radiation-curable preparations which comprise polymers with ethylenically unsaturated double bonds is known in principle of the coating of surfaces. Such preparations are generally applied to the substrate to be coated and, if desired, after a physical drying step are cured by exposure to high-energy radiation, for example by irradiating with UV light of wavelength in the range from 250 to 400 nm or by irradiating with high-energy electrons (electron beams; from 100 to 350 keV). It is known that radiation-curable preparations can be used for coating wood, leather, plastics and paper. There are also occasional indications of a use for coating metal surfaces, for example in coachbuilding (see Ullmann's Encyclopedia of Industrial Chemistry, 5th edition on CD-ROM, 1997, Paints and Coatings 3.7.4). The use of radiation-curable preparations for coating mineral substrates is not known. A comprehensive account of radiation-curable preparations and also of their uses is found, for example, in P. K. T. Oldring (editor), Chemistry and Technology of UV and EB preparations for Coatings and Paints, Vol. II, SITA Technology, London, 1991.

It is an object of the present invention to provide coatings for mineral moldings which effectively prevent effluorescence and at the same time do not disadvantageously change their strength and their visual appearance on exposure to moisture.

We have found that this object is achieved if a coating made from a radiation-curable preparation based on polymers which have ethylenically unsaturated double bonds is applied to the mineral molding.

The present invention therefore provides a process for preparing a coated molding which comprises at least one mineral binder, which process comprises 1) applying a radiation-curable preparation comprising at least one polymer P1 having ethylenically double bonds to the surface of the molding, if appropriate removing the solvent present and
2) curing the applied preparation by irradiating with UV radiation or electron beams.

Possible polymers P1 for the radiation-curable preparations according to the invention are in principle any polymer which has ethylenically unsaturated double bonds which can undergo free-radical polymerization on exposure to electromagnetic radiation, such as UV radiation or electron beams. Care should be taken here that the content of ethylenically unsaturated double bonds in the polymer is sufficient to ensure effective crosslinking. The content of ethylenically unsaturated double bonds in P1 is generally in the range from 0.01 to 1.0 mol/100 g of P1, preferably from 0.05 to 0.8 mol/100 g of P1 and very particularly preferably from 0.1 to 0.6 mol/100 g of P1. The term polymer here and below encompasses polymers, polycondensates and polyaddition products, chemically modified polymers, and also prepolymers which are obtainable by reacting polyfunctional compounds having at least three reactive groups with monofunctional or polyfunctional compounds which can react with the polyfunctional compounds with bond formation. Such prepolymers preferably have a number-average molecular weight $Mn \geq 800$ g/mol.

Preference is given to the use of preparations having ethylenically unsaturated polymers P1 where the ethylenically unsaturated double bonds in P1 are present as a group of the formula $$-P-Z-X-CR^1=CHR^2$$

where

X is a single bond, $CH_2$ or CO,

Z is a single bond, O or NH,

P is an organic radical of valency 2 or higher having from 2 to 10 carbon atoms, or is a single bond, $R^1$ is hydrogen or methyl, and $R^2$ is hydrogen, methyl or, if X is CO, also phenyl or $CO_2Y$, where Y is hydrogen or $C_1$–$C_4$-alkyl.

P is preferably selected from a single bond and from the class consisting of linear or branched $C_2$–$C_{10}$-alkylene, which may also, if desired, be interrupted by two or more non-adjacent oxygen atoms, or be substituted with OH. Examples of these are 1,2-ethylene, 1,2-propylene, 1,3-propylene, 1,4-butylene, 1,5-pentylene, 3-oxo-1,5-pentylene, 4-oxo-1,7-heptylene, 3,6-dioxo-1,8-octylene, or a single bond.

P may also be 3-, 4- or 5-valent aliphatic radicals derived, for example, from polyhydric alcohols, such as glycerol, trimethylolethane, -propane, -butane and pentaerythritol. P may also be directly bonded to the polymer backbone. P is preferably bonded to a heteroatom or bonded with the polymer via a functional group of the polymer, eg. an ester group, urea group, urethane group, amide group.

The polymer P1 particularly preferably has acryloxy, methacryloxy, acrylamido or methacrylamido groups. These may be bonded to the backbone of the polymer directly or via a group P, in particular via alkylene groups.

Such polymers P1 are known in principle to the person skilled in the art and are described in detail, for example, in P. K. T. Oldring (see above). They are generally silicones, polyurethanes, polyesters, polyethers, epoxy resins, melamine resins and methacrylate-based copolymers having in each case ethylenically unsaturated groups. Among these, preference is given to polymers which have acryloxy and/or methacryloxy groups as ethylenic double bonds. Such polymers are termed silicone acrylates, polyurethane acrylates, acrylate-modified polyesters or polyester acrylates, epoxy acrylates, polyether acrylates, melamine acrylates and acrylate-modified copolymers based on (meth)acrylates. It is moreover also possible to use ethylenically unsaturated polyesters as polymers P1.

The silicones having ethylenically unsaturated double bonds are generally linear or cyclic polydimethylsiloxanes which have allyl, methallyl, acryloyl or methacryloyl groups. The ethylenically unsaturated groups are bonded to the silicon atoms of the main backbone of the polydimethylsiloxane directly, via an oxygen atom, or via an alkylene group which is linear or branched and may be interrupted by one or more non-adjacent oxygen atoms. The preparation of such ethylenically unsaturated siloxanes is known in principle to the person skilled in the art and is described, for example, in P. K. T. Oldring (see above), p. 142–150. The full extent of the disclosure therein is incorporated herein by way of reference. Acrylate and/or methacrylate groups are introduced, for example, by esterifying Si—OH groups in polydimethylsiloxanes with the appropriate acid chlorides or the alkyl esters of these acids, for example the ethyl esters and methyl esters. Another method is to hydrosilylate the propargyl esters of ethylenically unsaturated carboxylic acids with dimethylchlorosilane and to react the chloroorganosilicon compound obtainable in this way with polydimethylsiloxanes containing OH groups. Another functionalization method starts from polydimethylsiloxanes which have a ω-chloroalkyl group on a silicon atom, for example 3-chloropropyl or 2-methyl-3-chloropropyl. Such compounds may be modified with ethylenically unsaturated compounds containing OH groups in the presence of suitable bases, for example tertiary amines, such as triethylamine, to give ethylenically unsaturated polysiloxanes. Examples of ethylenically unsaturated compounds containing OH groups are the esters of ethylenically unsaturated carboxylic acids with polyhydroxy compounds, eg. hydroxyalkyl acrylates and hydroxyalkyl methacrylates, such as hydroxyethyl (meth)acrylate, hydroxypropyl (meth) acrylate, 3-hydroxy-2,2-dimethylpropyl (meth)acrylate, trimethylolpropane di(meth)acrylate and pentaerythritol di- or tri(meth)acrylate.

The ethylenically unsaturated silicones mentioned are well known to the person skilled in the art and are generally commercially available. For further details, reference may be made to P. K. T. Oldring, p. 135–152 and the literature cited therein.

Suitable ethylenically unsaturated epoxy resin derivatives encompass in particular the reaction products of epoxy-group-containing compounds or oligomers with ethylenically unsaturated monocarboxylic acids, such as acrylic acid, methacrylic acid, crotonic acid and cinnamic acid. Instead of, or together with the monocarboxylic acids, it is also possible to use the monoesters of ethylenically unsaturated dicarboxylic acids with monoalcohols, such as methanol, ethanol, n-propanol, isopropanol, n-butanol, tert-butanol, n-hexanol and 2-ethylhexanol. Suitable epoxy-group-containing substrates encompass in particular the polyglycidyl ethers of polyhydric alcohols. These include the diglycidyl ethers of bisphenol A and of its derivatives, and moreover the diglycidyl ethers of oligomers of bisphenol A, obtainable by reacting bisphenol A with the diglycidyl ether of bisphenol A, and furthermore the polyglycidyl ethers of novolacs. The reaction products of the ethylenically unsaturated carboxylic acids with the glycidyl ethers under consideration may be modified with primary or secondary amines. It is moreover possible to introduce further ethylenically unsaturated groups into the epoxy resin by reaction of OH groups in epoxy resins with suitable derivatives of ethylenically unsaturated carboxylic acids, eg. the acid chlorides. Ethylenically unsaturated epoxy resins are well known to the person skilled in the art and are commercially available. For further details reference is made to P. K. T. Oldring, p. 37–68 and the literature cited therein.

Examples of ethylenically unsaturated melamine resins being suitable as polymers P1 are the reaction products of melamine-formaldehyde condensation products with compounds containing OH groups, with ethylenically unsaturated dicarboxylic anhydrides or with the amides of ethylenically unsaturated monocarboxylic acids. Suitable melamine-formaldehyde condensation products are in particular hexamethylolmelamine (HMM) and hexamethoxymethylolmelamine (HMMM). Suitable OH-group-containing compounds encompass, for example, the hydroxyalkyl esters of ethylenically unsaturated carboxylic acids, in particular of acrylic acid and methacrylic acid. Other possible compounds for the reaction with HMM are ethylenically unsaturated alcohols, such as allyl alcohol and crotyl alcohol, and ethylenically unsaturated dicarboxylic anhydrides, such as maleic anhydride. It is moreover possible to modify either HMM or HMMM with the amides of ethylenically unsaturated carboxylic acids, eg. acrylamide or methacrylamide, to give ethylenically unsaturated melamine resins. Such melamine resins are known to the person skilled in the art and are described, for example, in P. K. T. Oldring, p. 208–214, and also in EP-A 464 466 and DE-A 25 50 740, and reference is hereby made to these for further details.

The ethylenically unsaturated polymers P1 may moreover be polyesters which contain ethylenically unsaturated double bonds. A distinction should be made here between, on the one hand, materials termed ethylenically unsaturated polyesters which are obtainable by copolycondensation of conventional dicarboxylic acids together with ethylenically unsaturated dicarboxylic acids and/or with anhydrides of these and with low-molecular-weight diols, and on the other hand ethylenically modified polyesters obtainable by derivatizing free OH groups in conventional polyesters. The OH groups may be derivatized separately or during the preparation of the OH group-containing polyester.

Ethylenically unsaturated polyesters encompass in particular the copolycondensates of maleic anhydride with at least one other dicarboxylic acid and/or with its/their anhydride(s) and a low-molecular-weight diol. In this case, the dicarboxylic acids and/or the anhydrides of these are preferably selected from the class consisting of succinic acid, succinic anhydride, glutaric acid, glutaric anhydride, adipic acid, phthalic acid, terephthalic acid, isophthalic acid and in particular phthalic anhydride. Suitable diols are preferably selected from the class consisting of ethylene glycol, 1,2-propylene glycol, 1,4-butanediol, 1,5-pentanediol, neopentyl glycol and 1,6-hexanediol, in particular 1,2-propylene glycol.

Suitable hydroxyl-group-containing polyesters for modification giving ethylenically modified polyesters may be prepared in a usual manner by polycondensation of di- or polybasic carboxylic acids with dihydric alcohols and/or at least one other polyhydric alcohol component. Possible di- or polybasic carboxylic acids in this case are aliphatic and aromatic $C_3$–$C_{36}$-carboxylic acids and the esters and anhydrides of these. These include succinic acid, succinic anhydride, glutaric acid, glutaric anhydride, adipic acid, pimelic acid, suberic acid, azelaic acid, sebacic acid, phthalic acid, phthalic anhydride, isophthalic acid, terephthalic acid, tetrahydrophthalic acid, tetrahydrophthalic anhydride, trimellitic acid, trimellitic anhydride, pyromellitic acid and pyromellitic anhydride. Examples of possible dihydric alcohols are ethylene glycol, propylene glycol, 1,4-butanediol, 1,5-pentanediol, neopentyl glycol, 1,6-hexanediol, 2-methyl-1,5-pentanediol, 2-ethyl-1,4-butanediol, dimethylolcyclohexane, diethylene glycol, triethylene glycol, mixtures of these, and moreover also polyaddition polymers of cyclic ethers, such as polytetrahydrofuran, polyethylene glycol and polypropylene glycol. Possible polyhydric alcohols are in particular tri- to hexahydric alcohols, such as glycerol, trimethylolethane, trimethylolpropane, trimethylolbutane, pentaerythritol, ditrimethylolpropane, sorbitol, erythritol and 1,3,5-trihydroxybenzene. If the total number of OH groups in the alcohol component molecule is larger than the total number of carboxyl groups in the acid component molecule, an OH-group-containing polyester is obtained. These OH groups may be esterified in a known manner by usual processes with the abovementioned ethylenically unsaturated carboxylic acids, in particular acrylic and methacrylic acids. The water formed during the esterification reaction here may be removed, for example, by dehydrating agents, by extraction or by azeotropic distillation. The esterification usually takes place in the presence of a catalyst, eg. a strong acid, such as sulfuric acid, anhydrous hydrogen chloride, toluenesulfonic acid and/or acid ion exchangers. It is moreover possible to etherify the OH groups in the polyester with reactive, ethylenically unsaturated compounds, eg. with allyl chloride or methallyl chloride. Another embodiment relates to polyesters made from diols, dicarboxylic acids and at least one carboxylic acid of higher basicity. In this case, the hydroxyl groups are introduced into the polyester subsequently by reacting the carboxylic acids groups with alkylene oxides, such as ethylene oxide or propylene oxide. These alcohol functions may then be esterified or etherified in the manner described above. For further details, reference may be made to P. K. T. Oldring, p. 123–135. The abovementioned products are well known to the person skilled in the art and are commercially available. Their number-average molecular weight is generally in the range from 500 to 10,000 and preferably from 800 to 3,000.

Other possible ethylenically modified polyesters are polyesters obtainable by cocondensing conventional di- or polycarboxylic acids with conventional alcohol components and with ethylenically unsaturated monocarboxylic acids, preferably acrylic and/or methacrylic acid. Such polymers are known, for example, from EP-A 279 303, to which reference is hereby made for further details. Here, the ethylenically unsaturated groups have been introduced into the polyester during the construction of the polyester from its low-molecular-weight components.

The polymers P1 may also be ethylenically unsaturated polyethers. Ethylenically unsaturated polyethers are constructed from a main structure of polyether which has ethylenically unsaturated groups at its ends. The main structure of polyether is obtainable, for example, by reacting a di- or polyhydric alcohol, for example an alcohol mentioned above as a di- or polyol component for preparing polyesters, with epoxides, preferably with ethylene oxide and/or propylene oxide. This main structure of polyether also contains free OH groups, which may be converted in the manner described above into allyl, methallyl, crotyl or phenylallyl groups or esterified with ethylenically unsaturated carboxylic acids, in particular acrylic and/or methacrylic acid, or with suitable derivatives, such as acid chlorides, $C_1$–$C_4$-alkyl esters or anhydrides.

The polymers P1 may moreover be copolymers having ethylenically unsaturated groups and based on (meth) acrylates. Such ethylenically unsaturated polymers are generally obtainable by polymer-analogous reactions of functionalized polymers (polymers FP) which have free hydroxyl, carbonyl, carboxyl, isocyanate, amino and/or epoxy groups. The ethylenic double bonds are generally introduced by reacting with suitable, low-molecular-weight, ethylenically unsaturated compounds which have a functional group which can react with the reactive group in the polymer, developing a bond.

The functionalized polymers FP used as starting materials are generally obtainable by free-radical polymerization of at least one ethylenically unsaturated monomer having a functional group of the type mentioned above and, if desired, other ethylenically unsaturated comonomers. The ethylenically unsaturated monomers with a functional group generally make up from 5 to 50 mol %, preferably from 15 to 40 mol % and in particular from 20 to 35 mol %, of the total monomers to be polymerized. Examples of monomers with a functional group are hydroxyalkyl acrylates and hydroxyalkyl methacrylates, such as 2-hydroxyethyl (meth)acrylate, hydroxypropyl (meth)acrylate and 4-hydroxybutyl (meth)acrylate, aminoalkyl acrylates and aminoalkyl methacrylates, such as 2-aminoethyl (meth)acrylate, carbonyl compounds, such as acrolein, methacrolein, vinyl ethyl ketone, N-diacetonacrylamide and -methacrylamide, vinyl isocyanate, dimethyl-3-isopropenylbenzyl isocyanate, 4-isocyanatostyrene, and isocyanates of ethylenically unsaturated carboxylic acids, eg. methacryloyl isocyanate, ω-isocyanatoalkyl (meth)acrylatee, glycidyl compounds, such as glycidyl allyl and glycidyl methallyl ethers, the glycidyl esters of ethylenically unsaturated carboxylic acids, such as glycidyl (meth)acrylate, ethylenically unsaturated anhydrides, such as maleic anhydride and methacrylic anhydride and the amides of ethylenically unsaturated carboxylic acids, such as acrylamide and methacrylamide. Suitable comonomers are generally selected from the class consisting of esters of acrylic and of methacrylic acid and, if desired, vinylaromatic compounds. Examples of suitable comonomers are the $C_1$–$C_4$ esters of acrylic and methacrylic acids, such as methyl (meth)acrylate, ethyl (meth)acrylate, n-propyl (meth)acrylate, isopropyl (meth)acrylate, n-butyl (meth)acrylate, isobutyl (meth)acrylate and tert-butyl (meth)acrylate. Other suitable comonomers are styrene, 1-methylstyrene, 4-tert-butylstyrene and 2-chlorostyrene. To a subordinate extent, it is also possible to use monomers such as vinyl acetate, vinyl propionate, vinyl chloride, vinylidene chloride, conjugated dienes, such as butadiene and isoprene, vinyl ethers of $C_1$–$C_{20}$ alkanols, eg. vinyl isobutyl ether, acrylonitrile, methacrylonitrile and heterocyclic vinyl compounds, such as 2-vinylpyridine and N-vinylpyrrolidone. A preferred embodiment encompasses, as comonomers, at least one monomer selected from the class consisting of the esters of methacrylic acid, in particular methyl methacrylate, and at least one further comonomer, selected from the class consisting of the alkyl esters of acrylic acid, and/or styrene.

The ethylenically unsaturated compounds which have a functional group and are suitable for the polymer-analogous reaction are preferably selected from the class consisting of the abovementioned ethylenically unsaturated monomers with a functional group. A precondition is that the functionality of the ethylenically unsaturated compound can react with the functionalities on the polymer, with bond formation with the polymer. Suitable types of reaction here are condensation and addition reactions. Examples of functionality pairings are isocyanate/hydroxyl, isocyanate/amino, anhydride/hydroxyl, anhydride/amino, carbonyl/amino, carboxylic acid chloride/hydroxyl, glycidyl/hydroxyl, glycidyl/amino or amide and glycidyl/carboxyl. In a preferred embodiment, the ethylenically unsaturated polymer is obtainable by reacting a functionalized polymer having glycidyl groups with ethylenically unsaturated compounds having hydroxyl groups, in particular the hydroxyalkyl esters of the abovementioned ethylenically unsaturated carboxylic acids, eg. 2-hydroxyethyl acrylate. Examples of such ethylenically unsaturated polymers are found in EP-A 650 979, the full extent of the disclosure of which is incorporated herein by way of reference.

Further suitable polymers P1 are polyurethane derivatives which contain ethylenically unsaturated double bonds. Such polyurethanes are obtainable, for example, by reacting isocyanate-containing polyurethanes with ethylenically unsaturated compounds which themselves have at least one functional group reactive to isocyanate, for example primary or secondary amino or hydroxyl. Examples of suitable ethylenically unsaturated compounds with an amino or hydroxyl group are in particular the abovementioned esterification products of ethylenically unsaturated carboxylic acids with di- or polyols where at least one OH group remains unesterified, in particular $C_2$–$C_{12}$-hydroxyalkyl (meth)acrylates, such as hydroxyethyl (meth)acrylate, hydroxypropyl (meth)acrylate, butanediol mono(meth)acrylate, partial esterification products of polyhydric alcohols with acrylic and/or methacrylic acid, eg. trimethylolpropane mono- and di(meth)acrylate, pentaerythritol di- and tri(meth)acrylate, and moreover corresponding aminoalkyl esters and hydroxyalkylamides, such as N-hydroxyalkyl (meth)acrylamides and 3-aminoalkyl (meth)acrylates.

Polyurethanes containing isocyanate groups are obtained in a known manner by reacting aliphatic and/or aromatic di- or polyisocyanates as component A with compounds having OH groups (component B). The concomitant use of polyamines and aminoalcohols as component B is also possible to a subordinate extent. If amines and/or aminoalcohols are used, the resultant polyurethanes have urea groups. The number of isocyanate groups in the polyurethane is controlled, in a known manner, via the ratio of molar amounts of the starting materials.

The ethylenically unsaturated groups may be introduced subsequently into the polyurethane containing isocyanate groups in a known manner by polymer-analogous reaction. It is also possible to use the ethylenically unsaturated compounds with functionalities reactive to isocyanate groups directly as component C in preparing the polyurethanes.

Examples of the di- or polyisocyanates of component A are straight-chain or branched $C_4$–$C_{14}$-alkylene diisocyanates, cycloaliphatic diisocyanates with from 6 to 12 carbon atoms in total, aromatic diisocyanates with from 8 to 14 carbon atoms in total, polyisocyanates having isocyanurate groups, uretdione diisocyanates, polyisocyanates having biuret groups, polyisocyanates having urethane groups and/or allophanate groups, polyisocyanates containing oxadiazinetrione groups, uretoneimine-modified polyisocyanates or mixtures of these.

Examples of diisocyanates are tetramethylene diisocyanate, hexamethylene diisocyanate(1,6-diisocyanatohexane), octamethylene diisocyanate, decamethylene diisocyanate, dodecamethylene diisocyanate, tetradecamethylene diisocyanate, trimethylhexane diisocyanate and tetramethylhexane diisocyanate, and cycloaliphatic diisocyanates, such as 1,4-, 1,3- and 1,2- diisocyanatocyclohexane, 4,4'-di(isocyanatocyclohexyl)-methane, 1-isocyanato-3,3,5-trimethyl-5-(isocyanatomethyl)-cyclohexane (isophorone diisocyanate), and 2,4- and 2,6-diisocyanato-1-methylcyclohexane, and aromatic diisocyanates, such as 2,4-diisocyanatotoluene, 2,6-diisocyanatotoluene, tetra-methylxylylene diisocyanate, 1,4-diisocyanatobenzene, 4,4'- and 2,4-diisocyanatodiphenylmethane, p-xylylene diisocyanate, and also isopropenyldimethyltolylene diisocyanate.

The polyisocyanates having isocyanurate groups are in particular simple triisocyanatoisocyanurates, which are cyclic trimers of the diisocyanates, or mixtures with their higher homologs having more than one isocyanurate ring.

Uretdione diisocyanates are preferably cyclic dimerization products of diisocyanates. The uretdione diisocyanates may, for example, be used as sole component or in a mixture with other polyisocyanates, in particular the polyisocyanates containing isocyanurate groups. Suitable polyisocyanates having biuret groups preferably have an NCO content of from 18 to 22% by weight and an average NCO functionality of from 3 to 4.5.

Polyisocyanates having urethane and/or allophanate groups may, for example, be obtained by reacting excess amounts of diisocyanates with simple, polyhydric alcohols, for example trimethylolpropane, glycerol, 1,2-dihydroxypropane or mixtures of these. These polyisocyanates having urethane and/or allophanate groups generally have an NCO content of from 12 to 20% by weight and an aver ag e NCO functionality of from 2.5 to 3.

Polyisocyanates containing oxadiazinetrione groups can be prepared from diisocyanate and carbon dioxide.

Suitable OR-group-containing compounds of component B are the low-molecular-weight diols and polyols mentioned in connection with the preparation of polyesters, and also polyesterpolyols, in particular polyesterdiols. Examples of polyesterpolyols are reaction products from the abovementioned di- or polybasic, preferably dibasic, carboxylic acids with polyhydric, preferably dihydric and, if desired, additionally trihydric, alcohols. Examples of suitable starting components are the abovementioned polybasic carboxylic acid s and polyhydric alcohols. The polyesterdiols may also be oligomers of lactones, such as β-propiolactone, γ-butyrolactone and ε-caprolactone, obtainable by oligomerization of the lactones in the presence of starters based on the abovementioned low-molecular-weight diols. The abovementioned polyesterdi- or -polyols generally have number-average molecular weights in the range from 500 to 5,000, preferably from 750 to 3,000.

In a preferred embodiment of the present invention, the radiation-curable preparation contains at least one polyurethane PU1 which has ethylenically unsaturated double bonds and is water-dispersible. Such polyurethanes PU1 are generally reaction products made from (1) at least one organic di- or polyisocyanate,
(2) at least one polyesterdi- or -polyol,
(3) optionally one or more di- or polyols different from (2),
(4) at least one compound having at least one functional group reactive to isocyanate and at least one carboxyl group or carboxylate group,
(5) compounds with at least one group reactive to isocyanate and at least one copolymerizable, ethylenically unsaturated group,
(6) if desired, compounds different from 1)–5) and with at least one group reactive to isocyanate.

Possible di- or polyisocyanates (1) are any of the di- or polyisocyanates indicated as component A. The polyesterpolyols (2) are in particular polyesterdiols, as described above as component B.

The other di- or polyols (3) are low-molecular-weight diols or else triols, in particular with a molecular weight of less than 500 g/mol, which are used as chain extenders or crosslinking agents. Examples of these are the abovementioned di- and polyols.

Compounds used as other structural components (4) are those which contain at least one, preferably one or two, groups capable of reacting with isocyanate groups, ie. hydroxyl, primary amino or secondary amino, and at least one carboxyl or carboxylate group, for example hydroxycarboxylic acids and dihydroxycarboxylic acids, such as dimethylolpropionic acid, sulfonic-acid-containing carboxylic acids, eg. 5-sulfoisophthalic acid, aminosulfonic acids and aminocarboxylic acids. Aminocarboxylic acids are preferred and diaminocarboxylic acids are particularly preferred. Very particular preference is given to adducts of acrylic acid to $C_2$–$C_6$-, preferably $C_2$-alkylenediamines in a molar ratio of alkylenediamine:acrylic acid of preferably about 1:1 (PUD salt). The structural component (4) makes the polyurethanes dispersible on their own, ie. no aid to dispersion, such as protective colloids or emulsifiers, is needed for dispersion in water.

Carboxyl groups are neutralized, before or during dispersing in water, eg. by inorganic and/or organic bases, such as the hydroxides, carbonates or hydrogencarbonates of alkali metals, or by ammonia or primary, secondary or preferably tertiary amines, such as triethylamine.

Examples of structural component (5), which has at least one ethylenically unsaturated copolymerizable group and at least one, preferably one, group reactive to isocyanate, are esters of acrylic or methacrylic acid with polyols, where at least one hydroxyl group remains unesterified. $C_1$–$C_{12}$-Hydroxyalkyl (meth)acrylates are particularly preferred.

The structural components (6) which may be used if desired are at least bifunctional amine chain extenders or amine crosslinking agents, preferably of molecular weight in the range from 32 to 500 g/mol, and containing at least two primary or two secondary, or one primary and one secondary, amino groups.

Examples of these are diamines, such as diaminoethane, diaminopropane, diaminobutane, diaminohexane, piperazine, 2,5-dimethylpiperazine, amino-3-aminomethyl-3,5,5-trimethyl-cyclohexane (isophoronediamine, IPDA), 4,41-diaminodicyclohexylmethane, 1,4-diaminocyclohexane, aminoethylethanolamine, hydrazine, hydrazine hydrate, and triamines, such as diethylenetriamine and 1,8-diamino-4-aminomethyloctane.

Suitable proportions of the individual structural components (1)–(6) are given in gram equivalents, based on 1 equivalent of isocyanate groups in (1), of the groups which are reactive to isocyanates and are present in components (2)–(6); these are:

for (2), preferably from 0.1 to 0.8, in particular from 0.2 to 0.7, gram equivalents of hydroxyl groups, for (3), preferably from 0 to 0.8 and particularly preferably from 0 to 0.7, gram equivalents of hydroxyl groups, and for (6), preferably from 0 to 0.4 and in particular from 0 to 0.2, gram equivalents of groups reactive with isocyanate.

Component (4) is preferably used in amounts such that the polyurethane PU1 has a content of carboxyl and/or carboxylate groups per 100 g of polyurethane PU1 of from 0.005 to 0.2 mol, in particular from 0.001 to 0.1 mol and particularly preferably from 0.01 to 0.05 mol. The compounds (5) are preferably used in amounts such that the content of double bonds in the polyurethane, per 100 g of polyurethane PU1, is in the range from 0.1 to 0.3 mol and particularly preferably from 0.15 to 0.25 mol.

The number-average molecular weight of the polyurethane PU1 used according to the invention is preferably in the range from 500 to 30,000 and in particular from 1,000 to 10,000. The molecular weights may be determined by conventional gel permeation chromatography (polystyrene standard, eluent: tetrahydrofuran; UV detection).

The preparation of the polyurethanes PU1 is well known to the person skilled in the art and is described, for example, in EP-A 704 469, the full extent of the disclosure of which is hereby incorporated herein by way of reference.

Radiation-curable preparations based on the polyurethanes PU1 generally have the form of aqueous dispersions of the polyurethane PU1. The content of polyurethane PU1 in this dispersion is generally in the range from 5 to 70% by weight, preferably from 20 to 50% by weight and in particular from about 30 to 45% by weight, based on the total weight of the dispersion.

Another preferred embodiment of the present invention relates to the use of radiation-curable preparations which comprise, as polymer P1, at least one aliphatic polyurethane acrylate PU2, ie. a polyurethane with acrylate and/or methacrylate groups based on aliphatic di- or polyisocyanates. The polyurethane acrylates PU2 in question are preferably selected from the class consisting of the reaction products made from at least one polyisocyanate or from an isocyanate-group-containing polyurethane, each of which has at least 3 isocyanate groups, with at least one of the acrylic and/or methacrylic esters and/or amides which are described above and which still have at least one free OH and/or one $NH_2$ group.

Examples of suitable polyisocyanates with at least 3 isocyanate groups are the isocyanurates and biurets of the abovementioned diisocyanates, eg. diisocyanurates of isophorone diisocyanate, of hexamethylene diisocyanate, of trimethylhexamethylene diisocyanate and/or of dicyclohexylene 4,4'-diisocyanate. Suitable polyurethanes with at least three isocyanate groups are also the reaction products made from at least one alcohol having three or more hydroxyl groups, such as glycerol, trimethylolethane, trimethylolpropane, trimethylolbutane, pentaerythritol, ditrimethylolpropane, erythritol, sorbitol and mannitol, with one of the aliphatic di- or polyisocyanates described above, where the molar ratio of isocyanate groups to OH groups is preferably in the range from 1:1.5 to 1:3 and in particular from 1:1.5 to 1:2.5. The resultant polyisocyanate compounds are then reacted with the compounds containing OH and/or $NH_2$ groups, to give the corresponding polyurethane acrylates.

The polyurethane acrylates PU2 preferably have weight-average molecular weights in the range from 500 to 10,000 and particularly preferably from 800 to 3,000. Their content of acrylate and/or methacrylate units per 100 g of PU2 is generally in the range from 0.1 to 1.0 mol, preferably from 0.1 to 0.8 mol and in particular from 0.1 to 0.6 mol.

The aliphatic polyurethane acrylates PU2 may also be modified with amines. For the purposes of the present invention, in analogy with the amine-modified polyacrylates (see below) this is the conversion of some of the acrylate and/or methacrylate groups in the polyurethane acrylates PU2 to their Michael addition products by reaction with the abovementioned primary or secondary amines. Such amine-modified polyurethane acrylates may also contain urea groups, which are formed in the reaction of non-reacted isocyanate with the primary or secondary amines. Such polyurethane acrylates containing amine and urea groups are known from EP-A 447 845, the full extent of which is hereby incorporated herein by way of reference.

Other preferred embodiments are radiation-curable preparations which encompass, as polymers P1, a combination of at least one polyurethane acrylate, in particular an aliphatic polyurethane acrylate PU2, and at least one further polymer P1 different therefrom and with ethylenically unsaturated double bonds.

Preferred further polymers P1 are polyurethane acrylates, polyether acrylates and/or polyester acrylates, which may have been modified with amines if desired. Both the aliphatic polyurethane acrylate PU2 and also the further ethylenically unsaturated polymer P1 here have number-average molecular weights in the range from 500 to 10,000 and in particular from 800 to 3,000. In order to adjust to a suitable working consistency, such polymer combinations are preferably formulated in reactive diluents and in particular in alkylene glycol diacrylates and/or alkylene glycol dimethacrylates or in polyalkylene glycol acrylates and/or polyalkylene glycol methacrylates.

Besides the polymers P1, the preparations according to the invention may also contain low-molecular-weight substances different from P1 and capable of polymerization by cationic or free-radical pathways. These are generally compounds S, which have at least one ethylenically unsaturated double bond and/or one epoxy group and having a molecular weight <800 g mol. Such compounds S generally serve to adjust to the desired working consistency of the radiation-curable preparations. This is particularly important if the preparation contains no other diluents, such as water and/or inert organic solvents, or contains these only to a subordinate extent. Such compounds S are therefore also termed reactive diluents. The proportion of reactive diluents, based on the total amount of P1 and S in the radiation-curable preparation, is in the range from 0 to 50% by weight.

Examples of suitable reactive diluents S are vinyl-group-containing monomers, in particular N-vinyl compounds, such as N-vinylpyrrolidone, N-vinylcaprolactam and N-vinylformamide, also vinyl ethers, such as ethyl vinyl ether, propyl vinyl ether, isopropyl vinyl ether, butyl vinyl ether, isobutyl vinyl ether, tert-butyl vinyl ether, amyl vinyl ether, 2-ethylhexyl vinyl ether, dodecyl vinyl ether, octadecyl vinyl ether and cyclohexyl vinyl ether, ethylene glycol mono- and divinyl ethers, di-, tri- and tetraethylene glycol mono- and divinyl ethers, polyethyl ene glycol divinyl ether, ethylene glycol butyl vinyl ether, triethylene glycol methyl vinyl ether, polyethylene glycol methyl vinyl ether, cyclohexanedimethanol mono- and divinyl ethers, trimethylolpropane trivinyl ether, aminopropyl vinyl ether, diethylaminoethyl vinyl ether and polytetrahydrofuran divinyl ether, vinyl esters, such as vinyl acetate, propionate, stearate and laurate, and vinylaromatics, such as vinyltoluene, styrene , 2- and 4-butylstyrene and 4-decylstyrene, and also acrylic monomers, eg. phenoxyethyl acrylate, tert-butylcyclohexyl acrylate and tetrahydrofurfuryl (meth)acrylate.

Compounds containing vinyl groups may also be used directly as cataonically polymerizable compounds S. Further suitable compounds S are compounds containing epoxy groups, such as cyclopentene oxide, cyclohexene oxide, epoxidized polybutadiene, epoxidized soybean oil, 3',4'-epoxycyclohexylmethyl 3,4-expoxycyclohexanecarboxylate and glydidyl ethers, eg. butanediol diglycidyl ether, hexanediol diglycidyl ether, bisphenol A diglycidyl ether and pentaerythritol diglycidyl ether, and the concomitant use of cationically polymerizable monomers such as unsaturated aldehydes and ketones, dienes, such as butadiene, vinylaromatics, such as styrene, N-substituted vinylamines, such as vinylcarbazole, and cyclic ethers, such as tetrahydrofuran, is likewise possible.

The reactive diluents S may moreover also be the esters of ethylenically unsaturated carboxylic acids with low-molecular-weight di- or polyhydric alcohols, preferably the acrylic and methacrylic esters and in particular the acrylic esters, the alcohols preferably having no further functional groups or, or at most ether groups, besides the hydroxyl groups.

Examples of such alcohols are ethylene glycol, propylene glycol and more highly condensed representatives of the class, eg. diethylene glycol, triethylene glycol, dipropylene glycol and tripropylene glycol, butanediol, pentanediol, hexanediol, neopentyl glycol, alkoxylated phenolic compounds, such as ethoxylated and propoxylated bisphenols, cyclohexanedimethanol, alcohols having three or more OH groups, such as glycerol, trimethylolpropane, butanetriol, trimethylolethane, pentaerythritol, ditrimethylolpropane, dipentaerythritol, sorbitol, mannitol and the corresponding alkoxylated, in particular ethoxylated and propoxylated, alcohols.

Preferred reactive diluents S are the esterification products of the abovementioned di- or polyhydric alcohols with acrylic and/or methacrylic acid. Such compounds are generally termed polyacrylates or polyether acrylates. Hexanediol diacrylate, tripropylene glycol diacrylate and trimethylolpropane triacrylate are particularly preferred. Such compounds are disclosed, for example, in EP-A 624 610 and DE-A 37 06 355.

In a preferred embodiment, the abovementioned polyacrylates or polyether acrylates are modified with primary and/or secondary amines. Suitable amines encompass both primary and secondary aliphatic amines, such as n-butylamine, n-hexylamine, 2-ethylhexylamine, dodecylamine, octadecylamine, di-n-butylamine, cycloaliphatic amines, such as cyclohexylamine, heterocyclic amines, such as piperidine, piperazine, 1-ethylpiperazine and morpholine, primary amines containing heterocyclic groups, for example N-(aminoethyl) imidazole, N-(aminoethyl)morpholine, tetrahydrofurfurylamine and 2-aminoethylthiophene. Further suitable compounds of alkanolamines, such as ethanolamine, 3-aminopropanol and monoisopropanolamine, and moreover also alkoxyalkylamines, such as methoxypropylamine and aminoethoxyethanol. The molar ratio of amine groups to acrylate and/or methacrylate groups in the amine-modified polyacrylates or polyether acrylates is preferably in the range from 0.01:1 to 0.3:1. Examples of amine-modified polyacrylates or polyether acrylates are found in DE-A 37 06 355, the entire extent of the content of which is hereby incorporated herein by way of reference. Such amine-modified polyacrylates or polyether acrylates are furthermore commercially obtainable, for example as Laromer® grades LR 8956, LR 8889, LR 8869, LR 8894, PO 83F and PO 84F from BASF.

The radiation-curable preparations used according to the invention in principle encompass any liquid or flowable preparation of the polymers P1, ie. solutions and dispersions and, if the polymers are liquid, also their pure forms.

Pulverulent preparations of the present invention are moreover also encompassed, as known, for example, for powder-coating metallic surfaces. Hot-melt preparations are also possible, these bcoming flowable only at elevated temperature. Depending on the type of preparation, the radiation-curable preparations comprise usual auxiliaries, such as thickeners, flow control agents, defoamers, UV stabilizers, emulsifiers and/or protective colloids and fillers.

Suitable auxiliaries are well known to the person skilled in the art from coatings technology. Suitable fillers, in particular for aqueous dispersions of the polymers P1 encompass, inter alia, silicates, which are obtainable by hydrolyzing silicon tetrachloride (Aerosil® from Degussa), siliceous earth, talc, aluminum silicates, magnesium silicates, calcium carbonates, etc. Suitable stabilizers encompass typical UV absorbers, such as oxanilides, triazines, benzotriazoles (obtainable as Tinuvin® grades from Ciba Geigy) and benzophenones. These may be used in combination with usual free-radical scavengers, for example sterically hindered amines, eg. 2,2,6,6-tetramethylpiperidine and 2,6-di-tert-butylpiperidine (HALS compounds). Stabilizers are usually used in amounts of from 0.1 to 5.0% by weight and preferably from 0.5 to 2.5% by weight, based on the polymerizable components present in the preparation.

If curing is by UV radiation, the preparations to be used according to the invention comprise at least one photoinitiator. A distinction is to be made here between photoinitiators for free-radical curing mechanisms (polymerization of ethylenically unsaturated double bonds) and photoinitiators for cationic curing mechanisms (cationic polymerization of ethylenically unsaturated double bonds or polymerization of compounds containing epoxy groups). For curing by means of high-energy electrons (electron-beam curing), the use of photoinitiators may be dispensed with.

Suitable photoinitiators for free-radical photopolymerization, ie. polymerization of ethylenically unsaturated double bonds, are benzophenone and benzophenone derivatives, such as 4-phenylbenzophenone and 4-chlorobenzophenone, Michler's ketone, anthrone, acetophenone derivatives, such as 1-benzoylcyclohexan-1-ol, 2-hydroxy-2,2-dimethylacetophenone and 2,2-dimethoxy-2-phenylacetophenone, benzoin and benzoin ethers, such as methyl benzoin ether, ethyl benzoin ether and butyl benzoin ether, benzil ketals, such as benzil dimethyl ketal, 2-methyl-1-[4-(methylthio)phenyl]-2-morpholinopropan-1-one, anthraquinone and its derivatives, such as β-methylanthraquinone and tert-butylanthraquinone, acylphosphine oxides, such as 2,4,6-trimethylbenzoyldiphenylphosphine oxide, ethyl-2,4,6-trimethylbenzoylphenylphosphinate and bisacylphosphine oxides.

Suitable photoinitiators for cationic photopolymerization, ie. the polymerization of vinyl compounds or compounds containing epoxy groups, are aryl diazonium salts, such as 4-methoxybenzenediazonium hexafluorophosphate, benzenediazonium tetrafluoroborate and toluenediazonium tetrafluoroarsenate, aryliodonium salts, such as diphenyliodonium hexafluoroarsenate, arylsulfonium salts, such as triphenylsulfonium hexafluorophosphate, benzene- and toluenesulfonium hexafluorophosphate and bis[4-diphenylsulfoniophenyl] sulfide bishexafluorophosphate, disulfones, such as diphenyl disulfone and phenyl-4-tolyl disulfone, diazodisulfones, imidotriflates, benzoin tosylates, isoquinolinium salts, such as N-ethoxyisoquinolinium hexafluorophosphate, phenylpyridinium salts, such as N-ethoxy-4-phenylpyridinium hexafluorophosphate, picolinium salts, such as N-ethoxy-2-picolinium hexafluorophosphate, ferrocenium salts, titanocenes and titanocenium salts.

The abovementioned photoinitiators are used, if required, in amounts of from 0.05 to 20% by weight, preferably from 0.1 to 10% by weight and in particular from 0.1 to 5% by weight, based on the polymerizable components of the preparations according to the invention.

The radiation-curable preparations according to the invention may also comprise polymers which have cationically polymerizable groups, in particular epoxy groups. These include copolymers of ethylenically unsaturated monomers, the copolymers containing, as comonomers, ethylenically unsaturated glycidyl ethers and/or glycidyl esters of ethylenically unsaturated carboxylic acids.

They also include the glycidyl ethers of OH-group-containing polymers, such as OH-group-containing polyethers, polyesters, polyurethanes and novolacs. They include moreover the glycidyl esters of polymers containing carboxylic acid groups. If it is desired to have a cationically polymerizable component, the preparations according to the invention may comprise, instead of or together with the cationically polymerizable polymers, a low-molecular-weight, cationically polymerizable compound, for example a di- or polyglycidyl ether of a low-molecular-weight di- or polyol (see above) or the di- or polyester of a low-molecular-weight di- or polycarboxylic acid, for example the cationically polymerizable reactive diluents specified above.

The radiation-curable preparations to be used according to the invention may also moreover comprise conventional polymers P2, ie. polymers which have no ethylenically unsaturated, radiation-curable double bonds. Such polymers P2 should preferably have a glass transition temperature of below 50° C., particularly preferably <40° C. The glass transition temperature here is the midpoint temperature according to ASTM D 3418-82, determined by differential thermal analysis (DSC; cf. also R. Zosel, Farbe und Lack 82 (1976), 125–134).

Such conventional polymers P2 are generally built up by free-radical polymerization of ethylenically unsaturated monomers, from 65 to 100% by weight of the monomers to be polymerized, preferably from 80 to 100% by weight and in particular from 90 to 99.9% by weight, being selected from the class consisting of monomers A which encompass vinylaromatic compounds, vinyl esters of aliphatic carboxylic acids having from 1 to 12 carbon atoms, $C_1$–$C_{10}$-alkyl acrylates and $C_1$–$C_{10}$-alkyl methacrylates. Vinylaromatic monomers encompass in particular styrene, α-methylstyrene, vinyltoluenes and chlorostyrenes. The vinyl esters encompass in particular vinyl acetate, vinyl propionate and vinyl Versatate® (=the vinyl ester of the Versatic® acids). The acrylates and methacrylates respectively encompass in particular the esters of, respectively, acrylic and methacrylic acids with methanol, ethanol, n-propanol, isopropanol, n-butanol, isobutanol, tert-butanol, n-pentanol, n-hexanol, 2-ethylhexanol, n-octanol, cyclohexanol and very particularly preferably methanol, n-butanol, tert-butanol and 2-ethylhexanol. The monomers to be polymerized encompass moreover up to 35% by weight, preferably up to 20% by weight and in particular from 0.1 to 10% by weight of monomers B, which are polymerizable with the monomers A. Monomers B encompass in particular acrylonitrile, methacrylonitrile, α-olefins, such as ethylene, propene and isobutene, dienes, such as butadiene and isoprene, vinyl chloride, vinylidene chloride, acrylic acid, methacrylic acid, itaconic acid, maleic acid, fumaric acid, the amides of these acids, the N-alkylolamides of these acids, in particular N-methylol(meth)acrylamide, hydroxyalkyl esters of these acids, in particular 2-hydroxyethyl (meth)acrylate and hydroxypropyl (meth)acrylate, and also ethylenically unsaturated sulfonic acids, eg. vinylsulfonic acid, styrenesulfonic acid and acrylamido-2-methylpropanesulfonic acid. The monomers B are preferably selected from the class consisting of acrylic acid, methacrylic acid, the amides of these, acrylamido-2-methylpropanesulfonic acid, acrylonitrile and methacrylonitrile.

The adjustment to the desired glass transition temperature may be achieved by selecting suitable combinations of monomers A, in particular by combining at least one "hard" monomer whose homopolymer tends to have a glass transition temperature of above 60° C. and at least one "soft" monomer whose homopolymer tends to have a glass transition temperature of below 30° C. Suitable monomer combinations are in principle known to the person skilled in the art, eg. from EP-A 469 295, or can be determined in a known manner by applying the Fox relationship (T. G. Fox, Bull. Am. Phys. Soc. Ser II, 1 (1956), 123). Important monomer combinations which are suitable for adjusting to the desired glass transition temperature encompass styrene/2-ethylhexyl acrylate and/or n-butyl acrylate; methyl methacrylate/2-ethylhexyl acrylate and/or n-butyl acrylate; methyl methacrylate and tert-butyl methacrylate/2-ethylhexyl acrylate and/or n-butyl acrylate.

The preparation of such polymers P2 is well known to the person skilled in the art and generally takes place by free-radical, aqueous emulsion polymerization of the above-mentioned monomers in the presence of at least one free-radical polymerization initiator and, if desired, a surfactant selected from the class consisting of emulsifiers, and/or protective colloids. Suitable conventional polymers are descriibed, for example, in EP-A 469 295 and WO 96/33143, the entire extent of the contents of which are hereby incorporated herein by way of reference. In a preferred embodiment of the invention, such conventional polymers P2 are formulated in the form of their aqueous dispersions with aqueous dispersions of the polymers P1, for example of the polyurethanes PU1, eg. with the polyurethanes of EP-A 704 469. Dispersions of polymers P1 are also known, for example, from EP-A 12 339, the entire content of which is hereby incorporated herein by way of reference.

According to the invention, the radiation-curable preparations are used for coating moldings which comprise at least one mineral binder (mineral moldings). For this, the radiation-curable preparations are applied in a known manner, eg. by spraying, trowelling, knife application, brushing, rolling or pouring onto the mineral molding. It is also conceivable that the preparation may be applied to the mineral molding by hot-melt processes or by powder-coating processes. The coating weight is usually in the range from 3 to 200 g/m², preferably from 10 to 100 g/m², based on the polymerizable components present in the preparation: P1 and, if appropriate, S. The application may take place either at room temperature or at elevated temperature, but preferably not at above 100° C. The coatings are then cured by exposure to high-energy radiation, preferably by UV radiation of wavelength from 250 to 400 nm or by irradiation with high-energy electrons (electron beams; from 150 to 300 kev). Examples of UV sources are high-pressure mercury vapor lamps, eg. the CK or CK1 sources from IST. The radiation dose usually sufficient for crosslinking is in the range from 80 to 3,000 mJ/cm². Any solvent present, in particular water, is dried out before the curing in a separate drying step preceding curing, for example by heating to temperatures in the range from 40 to 80° C. or by exposure to IR radiation.

Before the radiation-curable preparations according to the invention are applied, the mineral molding may also be coated with a conventional coating composition which comprises, as binder, one of the conventional polymers P2 described above. It is furthermore also possible for initial coating compositions to comprise, besides the conventional polymer P2, a radiation-curable, ethylenically unsaturated polymer, preferably in dispersed form, for example a polyurethane PU1. In this case, PU1 and P2 are preferably formulated in a weight ratio PU1:P2 in the range from 20:1 to 1:20, preferably from 10:1 to 1:10.

The first coatings are preferably coatings based on aqueous polymer dispersions of the polymers P2 and, if desired, P1. The polymers P2 are preferably those which have been prepared by free-radical aqueous emulsion polymerization. These dispersions may be formulated by known processes with radiation-curable polymers P1. For this it may be required that P1 or a polymer blend is converted into an aqueous dispersion by a known process. However, it is preferable for aqueous dispersions of conventional polymers P2 to be formulated with radiation-curable polymers P1 which are in the form of aqueous dispersions.

Such coating compositions generally comprise, besides the polymeric binder, fillers and/or pigments, and also usual auxiliaries, eg. wetting agents, viscosity modifiers, dispersants, defoamers, preservatives and hydrophobisizers, biocides, fibers and other usual constituents. Examples of suitable fillers are aluminosilicates, silicates, alkaline-earth metal carbonates, preferably calcium carbonate in the form of calcite or lime, dolomite, and also aluminum silicates or magnesium silicates, eg. talc. Typical pigments are titanium dioxide, iron oxides and barium sulfate.

The solids content of suitable first coatings is generally in the range from 20 to 80% by weight, preferably from 30 to 60% by weight, based on the total weight of the conventional coating, and of this preferably at least 30% by weight, particularly preferably at least 50% by weight and in particular from 50 to 90% by weight, are made up by the polymeric binder, and preferably not more than 70% by weight, in particular from 10 to 50% by weight, by pigments and/or fillers.

The initial coating compositions comprise as liquid component essentially water and, if desired, an organic liquid miscible with water, for example an alcohol, such as glycol or glycerol, a polyetheralcohol or else industrial solvent mixtures, such as Texanol® (Eastman Kodak) or Lusolvan® FBM (BASF). If they are required, conventional coating compositions are applied at a wet coating weight in the range from 50 to 500 g/m$^2$, in particular from 70 to 300 g/m$^2$, in a known manner, for example by spraying, trowelling, knife application, brushing, rolling or pouring onto the mineral molding. Before the radiation-curable preparation is applied, this initial coating is then dried at room temperature or preferably at elevated temperature, for example at from 40 to 100° C.

According to the invention, the mineral moldings may also be coated exclusively with the radiation-curable preparations described above. In this case, the coating may have one, two or more layers, the individual layers having identical or different preparations. For example, a first layer may therefore be built up by coating with a preparation which encompasses a polymer P1 dispersed in water, for example a polyurethane PU1, and also fillers, pigments and auxiliaries if desired, and one or more further radiation-curable layers, preferably based on non-aqueous preparations is/are then applied to this. The first layer may also, of course, be built up with non-aqueous radiation-curable preparations.

The novel process for coating the surfaces of mineral moldings is in principle applicable to all moldings which comprise a mineral binder. The coatings may be used either on mineral moldings which have cured or else on freshly prepared ("green") mineral moldings. Mineral moldings coated in this way have no effluorescence, even after relatively long exposure to moisture. The coating moreover differs from the coatings known hitherto in that it remains intact even on relatively long exposure to moisture, ie. behavior associated with swelling, such as softening of the coating or blister formation, is not observed.

The advantageous effects of the novel process are particularly well developed in the case of mineral moldings which comprise cement as mineral binder (precast concrete products and fiber-reinforced concrete panels). For the purposes of the invention, precast concrete products are molded structures made from concrete and/or gas concrete, eg. slabs, pipes and in particular roofing tiles (concrete roofing tiles). The precast concrete product is produced in a known manner from previously mixed concrete by an extrusion process. The preparations according to the invention have the advantage that they can be applied not only to a precast concrete product which has set but also to one which is freshly prepared and unset ("green"). Surprisingly, the amount of from about 5 to 10% by weight of water remaining in the precast concrete product does not lead to swelling and blister formation, and lime effluorescence caused by the water which diffuses through the coating is not observed.

The advantageous properties of the radiation-curable preparations according to the invention are also applicable to mineral moldings which are coated with a cement slurry. This cement slurry generally encompasses the usual pigments, a cement as mineral binder, the usual auxiliaries and a suitable amount of water, and is applied to the mineral molding, preferably a precast concrete product, which has not yet finally set. The cement slurry layer, when set, generally has a thickness in the range from 200 $\mu$m to 2,000 $\mu$m.

The coatings according to the invention moreover prove to be similarly advantageous for fiber-reinforced concrete panels, ie. flat mineral moldings which comprise cement as binder and comprise mineral or organic fibers, eg. polyester fibers and/or polyamide fibers as aggregates. The fiber-reinforced concrete panels according to the invention also show no effluorescence or swelling of the protective layer after intensive weathering. The radiation-curable preparations according to the invention are therefore particularly suitable for preserving mineral moldings subjected to weathering. Mineral moldings coated according to the invention, furthermore, show extremely low tendency to block, even when under high load for relatively long periods. This advantage is particularly applicable in the case of fiber-reinforced concrete panels, since these are frequently stacked in storage. The coatings moreover have high scratch resistance and hardness, and at the same time high elasticity, ie. ultimate tensile strength.

EXAMPLES

I. Coating of precast concrete products

The mineral molding was a "green" precast concrete product, which had been produced in the form of a flat stone block of dimensions 30×20×1.8 cm by extrusion of a mortar made from sand (particle size up to 0.3 mm) and cement (weight ratio 1:3), and also water at a water/cement weight ratio of 0.4.

Using a spray pistol (about 2 bar spray pressure), this "green" precast concrete product was sprayed uniformly with a reddish-brown paint (paint 1), until a wet coating weight of 105 g/m$^2$ was achieved, followed by curing at 60° C. for 8 hours. The reddish-brown paint was a pure acrylate dispersion (based on methyl methacrylate/n-butyl acrylate; weight ratio 4.5/5.5) mixed with an iron oxide pigment, with a solids content of 60% by weight and a pigment volume concentration of 30%, and also comprising 0.5% by weight, based on the total weight of the paint, of a commercially available defoamer. This concrete slab (base slab 1) was used for the following coating experiments.

Comparative Example 1C

A base slab 1 was coated a second time with paint 1 in the manner described above to a wet coating weight of 53 g/m², and then dried at 60° C. for 3 hours.

Comparative Example 2C

The coated concrete slab obtainable according to Comparative Example 1C was irradiated with a UV lamp (CK source from IST) with an intensity of 120 W/cm².

Comparative Example 3C

A base slab was coated a second time in the manner described above with paint 1 which additionally comprised 0.5% by weight of benzophenone, based on the total weight of the paint, until a wet coating weight of 53 g/m² was achieved, and then dried at 60° C. for 3 hours.

Comparative Example 4C

The coated concrete slab from Comparative Example 3C was irradiated with a UV lamp in the manner described for Comparative Example 2.

The following commercial products were used for the Examples:

Laromer® LR 8949 from BASF: 40% strength by weight aqueous polyurethane dispersion; $M_n$ about 1,000; 0.17 mol of acrylate groups per 100 g of resin, Laromer® UA 19T from BASF: Polyurethane acrylate; $M_n$ about 1500; 0.1 mol of acrylate groups per 100 g of resin; 65% by weight strength in tripropylene glycol diacrylate, Laromer® PO 84 F from BASF: amino-modified polyether acrylate from BASF; $M_n$ about 720; 0.41 mol of acrylate groups per 100 g of resin, Laromer® LR 8861 from BASF: aliphatic polyurethane acrylate; $M_n$ about 1,200; 0.28 mol of double bonds per 100 g of resin; 70% strength by weight in dipropylene glycol diacrylate, Laromer® LR 8981 from BASF: amino-modified polyester acrylate; $M_n$ about 1,100; 0.3 mol of double bonds per 100 g of resin, Laromer® LR 8862 from BASF: amino-modified polyurethane acrylate; $M_n$ about 1,150; 0.21 mol of double bonds per 100 g of resin; 70% strength by weight in dipropylene glycol diacrylate, Lucirin® TPO-L from BASF: 2,4,6-trimethylbenzoylethylphenyl phosphinate, Irgacure® 184 from Ciba-Spezialitätenchemie (1-benzoyl-1-hydroxycyclohexane), Irgacure® 500 from Ciba-Spezialitätenchemie (mixture made from benzophenone and 1-benzoyl-1-hydroxycyclohexane in a weight ratio of 1:1), Tinuvin® 400 from Ciba-Spezialitätenchemie (4,6-bis-(2,4-dimethylphenyl)-2-(2-hydroxy-3-C12-C13-alky loxy-2-hydroxypropyl-1-oxyphenyl)triazine), Tinuvin® 292 from Ciba-Spezialitätenchemie (diester of sebacic acid with 2,2,6,6-tetramethyl-4-hydroxypiperidine).

Example 1

Using a spray pistol, a base slab 1 was coated uniformly with a radiation-curable preparation made from 88.5 PW[1] of a radiation-curable polyurethane dispersion, Laromer® LR 8949 from BASF,

[1] PW =parts by weight 0.5 PW of a polyurethane thickener (Acrysol® RM 8 from Röhm & Haas), 0.2 PW of defoamer (Dehydran® 1293 from Henkel), 2.1 PW of a 50% strength solution of Irgacure® 184 in butylene diglycol 7.8 PW of water until a wet coating weight of about 40 g/m² was achieved, followed by drying at 60° C. for 20 minutes and then irradiating with a UV lamp as described in Comparative Example 2C.

Example 2

Using a flow-cup pistol, a base slab 1 was coated with a radiation-curable preparation made from 7.1 PW of polyurethane acrylate (Laromer® UA19T from BASF), 59.5 PW of amino-modified polyether acrylate (Laromer® P084F from BASF), 2.9 PW of photoinitiator Irgacure® 500 and 19 PW of hexanediol diacrylate with a coating weight of 25 g/m², followed by irradiation as described in Example 1.

Example 3

A base slab was coated with a radiation-curable preparation made from

19 PW of hexanediol diacrylate, 38.3 PW of polyurethane acrylate (Laromer® LR 8861 from BASF), 38.3 GT amino-modified polyether acrylate (Laromer® LR 8981 from BASF), 1.9 PW of photoinitiator Irgacure® 184, 1.0 PW of photoinitiator Lucirin® TPO-L and 1.5 PW of stabilizer system made from a UV absorber and a sterically hindered amine (Tinuvin® 400 and Tinuvin® 292 in a weight ratio of 2:1)

Example 4

90 PW of a 50% strength by weight pure acrylate dispersion based on methyl methacrylate/n-butyl acrylate (5.5/4.5) and 10 PW of Laromer® LR 8949 (40% strength by weight) were formulated together with 10 PW of a reddish-brown oxide pigment and 0.5 PW of a commercially available defoamer to give a paint 2. The paint 2 was uniformly sprayed onto a freshly produced precast concrete product (see above) until a wet application coating weight of 105 g/m² was achieved, followed by drying at 60° C. for 8 hours (base slab 2).

A base slab 2 was coated in the manner described in Example 2 with the radiation-curable preparation from Example 2, with an application weight of 25 g/m², and then cured as described therein.

II Performance testing of the coated precast concrete products

The coated precast concrete products described in the Examples and Comparative Examples were placed with the coated side on a steambath heated to 60° C. for 7 days. The area exposed to the steam was then visually assessed and marks from 0 to 5 given for water repellancy. For the purposes of the invention, this is the running off of water from the surface of a slab. The mark 0 indicates that the water virtually remains in place (lack of water repellency). The mark 5 corresponds to complete water repellancy of the surface. Low water repellancy is accompanied by severe swelling of the coating, and in contrast the mark 5 for water repellancy indicates that the surface has not swollen despite the treatment with steam for seven days.

Mark 0: no water repellancy
Mark 1: water repellancy weakly discernible
Mark 2: discernible water repellancy
Mark 3: marked water repellancy
Mark 4: extensive water repellancy
Mark 5: virtually complete water repellancy

TABLE 1

Water repellancy of coated precast concrete products exposed to steam for 7 days

| Precast concrete product Ex.: | Mark |
|---|---|
| 1C | 0 |
| 2C | 0 |
| 3C | 0 |
| 4C | 0 |
| 1 | 1 |
| 2 | 5 |
| 3 | 5 |
| 4 | 5 |

III Production of coated fiber-reinforced concrete panels

The mineral molding used in the following coating examples was a commercially available fiber-reinforced concrete panel (a flat facade panel from Eternit).

Comparative Example 5C

A fiber-reinforced concrete panel was coated with a paint 3 in the manner described in Example 1 until a wet coating weight of 80 g/m² was achieved, followed by drying at 60° C. for 8 hours. This panel is termed base panel 1 below.

Paint 3 was a preparation based on a commercially available styrene/n-butyl acrylate dispersion (weight ratio 6.5/3.5). The paint comprised micronized iron oxide pigment, commercially available titanium dioxide and 0.5% by weight of commercially available defoamer, and had a solids content of 41% by weight and a pigment volume concentration of 17%.

Comparative Example 6C

A further 40 g/m² (wet coating weight) of paint 3 were applied to a base panel 1, followed by drying at 60° C. for 8 hours.

Comparative Example 7C

A fiber-reinforced concrete panel was coated with a paint 4 in the manner described in Example 1, until a wet coating weight of 80 g/m² was achieved, followed by drying at 60° C. for 8 hours. This panel is termed base panel 2 below.

Paint 4 was a preparation comparable with paint 3, except that a dispersion based on methyl methacrylate/n-butyl acrylate (weight ratio 6.5/3.5) was used instead of a styrene/n-butyl acrylate dispersion.

Comparative Example 8C

A further 40 g/m² of paint 4 were applied to a base panel 2 in a manner similar to that of Comparative Example 6C, and dried.

Example 5

A radiation-curable preparation made from
38.8 PW of Laromer® LR 8861,
38.3 PW of Laromer® LR 8862,
19.0 PW of hexanediol diacrylate,
1.9 PW of photoinitiator (Irgacure® 184),
1.0 PW of photinitiator (Lucirin® TPO-L),
1.0 PW of UV absorber (Tinuvin® 400) and
0.5 PW of a sterically hindered amine (HALS compound Tinuvin® 292)
were applied with a coating weight of 25 g/m² to a base panel 1, followed by irradiation with a CK source from IST with an intensity of 120 W/cm².

Example 6

A base panel 2 was coated in a manner similar to that of Example 5.

Example 7

A radiation-curable preparation made from
38.3 PW of Laromer® LR 8861,
38.3 PW of Laromer® LR 8981,
19.0 PW of hexanediol diacrylate,
1.9 PW of photoinitiator (Irgacure® 184),
1.0 PW of photoinitiator (Lucirin® TPO-L),
1.0 PW of UV absorber (Tinuvin® 400) and
0.5 PW of HALS compound (Tinuvin® 292)
were applied with a coating weight of 25 g/m² to a base panel 1, followed by irradiation with a CK source from IST with an intensity of 120 W/cm².

Example 8

A base panel 2 was coated in a manner similar to that of Example 7.

Example 9

A radiation curable preparation made from
38.8 PW of Laromer® LR 8861,
38.3 PW of Laromer® LR 8862,
19.0 PW of hexanediol diacrylate,
1.0 PW of UV absorber (Tinuvin® 400) and
0.5 PW of a sterically hindered amine (HALS compound Tinuvin® 292 )
were applied with a coating weight of 25 g/M² to a base panel 1, followed by irradiation with electronic beams with an intensity of 6 MRad.

Example 10

Example 9 was repeated with a different radiation-curable composition, wherein Laromer® LR 8862 had been completely substituted by Laromer®b LR 8981.

IV Performance testing of the fiber-reinforced concrete panels

The fiber-reinforced concrete panels of Examples 5–10, coated according to the invention, and also those of Comparative Examples 5C and 8C, were investigated for their tendency to block. For this, the coated side of the panels was subjected for 16 hours at 50° C. to a load of 1 kg/cm², using a circular ram (d about 10 cm). An assessment was made as to whether the ram could be removed without damaging the coating. The mark 0 indicates that the coating remains free from defects after removal of the ram. For the mark 1, the coating has minimal surface damage in the region subjected to the load. The mark 2 corresponds to easily recognizable local damage in the area subjected to the load. The mark 3 corresponds to some destruction of the coating in the area subjected to the load. The mark 4 corresponds to extensive destruction of the coating in the area subjected to the load, and the mark 5 to complete destruction, with damage to the marginal areas not subjected to the load.

TABLE 2

Blocking tendency of the coated fiber-reinforced concrete panels of Examples 5–10, 6C and 8C

| Fiber-rein-forced concrete panels Ex. | Mark |
|---|---|
| 6C | 2 |
| 8C | 2 |
| 5 | 0 |
| 6 | 0 |
| 7 | 0 |
| 8 | 0 |
| 9 | 0 |
| 10 | 0 |

We claim:

1. A process for preparing a coated mineral molding which comprises at least one mineral binder, the mineral molding having at least one first conventional coating, which comprises as a binder at least one polymer P2 having a glass transition temperature <50° C. which process comprises 1) applying a radiation-curable preparation which comprises at least one polymer P1 having ethylenically unsaturated double bonds to the first coating, if appropriate removing the solvent present and 2) curing the applied preparation by irradiating with UV radiation or electron beams.

2. The process as claimed in claim 1, wherein the content of ethylenically unsaturated double bonds in the polymer P1 is in the range from 0.01 to 1.0 mol/100 g of P1.

3. The process as claimed in claim 1, wherein the ethylenically unsaturated double bonds in P1 are present as a group of the formula

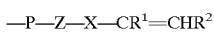

—P—Z—X—CR$^1$=CHR$^2$ where

X is a single bond, CH$_2$ or CO,

Z is a single bond, O or NH,

P is an organic radical of valency 2 or higher having from 2 to 10 carbon atoms, or is a single bond, R$^1$ is hydrogen or methyl, and R$^2$ is hydrogen, methyl or, if X is CO, also phenyl or CO$_2$Y, where Y is hydrogen or C$_1$–C$_4$-alkyl.

4. The process as claimed in claim 1, wherein P1 is selected from the class consisting of the silicones, polyurethanes, polyesters, polyethers, epoxy resins, melamine resins and (meth)acrylate-based copolymers having in each case ethylenically unsaturated groups.

5. The process as claimed in claim 1, wherein the radiation-curable preparation comprises, as polymer P1, at least one water-dispersible polyurethane PU1.

6. The process as claimed in claim 1, wherein the radiation-curable preparation comprises at least one polymer P1 and at least one low-molecular-weight compound S different from P1 which has a molecular weight M<800 and which has at least one ethylenically unsaturated double bond and/or at least one epoxy group.

7. The process as claimed in claim 6, wherein the radiation-curable preparation comprises, as polymer P1, an aliphatic polyurethane acrylate PU2 and, as low-molecular-weight component S, a polyacrylate functionalized with amino groups.

8. The process as claimed in claim 1, wherein the radiation-curable preparation comprises at least one aliphatic polyurethane acrylate PU2 and at least one other polymer P1 different therefrom, which is selected from the class consisting of polyurethane acrylates, polyether acrylates and polyester acrylates, which are modified with amines if desired.

9. The process as claimed in claim 1, wherein the radiation-curable preparation additionally comprises a conventional polymer P2 with a glass transition temperature<50° C.

10. A process as claimed in claim 1, wherein the molding to be coated has a first coating comprising, as binder, at least one conventional polymer P2 as defined in claim 9, and at least one radiation-curable polymer P1 as defined in claim 1.

11. A process as claimed in claim 1, wherein the first coating is applied to the mineral molding in the form of an aqueous coating composition which comprises at least one conventional polymer P2 and, if desired, a radiation-curable polymer P1, and is dried, and then a radiation-curable preparation as defined in claim 1 is applied to the coating thus obtained, dried if desired and then cured with UV radiation or electron beams.

12. A process as claimed in claim 1, wherein the mineral molding is selected from the class consisting of precast concrete products and fiber-reinforced concrete panels.

13. A process as claimed in claim 13, wherein the mineral molding is a freshly produced precast concrete product.

14. A coated mineral molding obtained by a process as claimed in claim 1 which has a first coating composition comprising as binder at least one conventional polymer P2 and, if desired at least a radiation-curable polymer P1 and at least one second coating made from a radiation-curable preparation as defined in claim 1.

* * * * *

UNITED STATES PATENT AND TRADEMARK OFFICE
CERTIFICATE OF CORRECTION

PATENT NO. : 6,136,383
DATED : October 24, 2000
INVENTOR(S) : Manfred Schwartz et al.

It is certified that error appears in the above-identified patent and that said Letters Patent is hereby corrected as shown below:

Column 1,
Lines 34 & 35, "DE-A 43 17 035," should read -- DE-A 43 17 036, --.

Column 7,
Line 31, "(meth)acrylatee," should read -- (meth)acrylate --.

Column 9,
Line 28, "aver ag e" should read -- average --;
Line 31, "OR-group-containing" should read -- OH-group-containing --;
Line 40, "acid s" should read -- acids --.

Column 10,
Line 44, '4,4-1-diaminodicyclohexylmethane," should read -- 4,4'-diaminodicyclohexylmethane, --.

Column 12,
Line 57, "cataonically" should read -- cationically --.

Column 16,
Line 25, "descriibed" should be -- described --.

Column 19,
Line 54, "(2-hydroxy-3-C12-C13-alky loxy-2-" should read -- 2-hydroxy-3-C12-C13-alkyloxy-2- --.

UNITED STATES PATENT AND TRADEMARK OFFICE
CERTIFICATE OF CORRECTION

PATENT NO. : 6,136,383
DATED : October 24, 2000
INVENTOR(S) : Manfred Schwartz et al.

It is certified that error appears in the above-identified patent and that said Letters Patent is hereby corrected as shown below:

Column 22,
Line 44, "25 g/M$^2$" should read -- 25 g/m$^2$ --.

Signed and Sealed this

Sixth Day of November, 2001

Attest:

NICHOLAS P. GODICI
Attesting Officer  Acting Director of the United States Patent and Trademark Office